United States Patent [19]

Magnusson et al.

[11] Patent Number: 5,328,609
[45] Date of Patent: Jul. 12, 1994

[54] MULTI-STAGE RADIAL FLOW FILTRATION SYSTEM

[76] Inventors: Jon H. Magnusson; Kristofer J. Magnusson, both of 117 Wild Wood Beach Rd., Mahtomedi, Minn. 55115

[21] Appl. No.: 977,077

[22] Filed: Nov. 16, 1992

[51] Int. Cl.⁵ .............................................. B01D 24/00
[52] U.S. Cl. .................................. 210/314; 210/266; 210/282; 210/444; 210/446; 210/295
[58] Field of Search ............... 210/767, 266, 282, 290, 210/456, 807, 321.78, 321.87, 287, 289, 288, 455, 314, 444, 446, 295; 55/316

[56] References Cited

U.S. PATENT DOCUMENTS

| | | | |
|---|---|---|---|
| 3,132,501 | 5/1964 | Jacobs et al. | 210/314 |
| 4,452,695 | 6/1984 | Schmidt | 210/444 |
| 5,024,764 | 6/1991 | Holler | 210/266 |
| 5,078,877 | 1/1992 | Cudaback et al. | 210/456 |
| 5,126,043 | 6/1992 | Giordano et al. | 210/314 |

Primary Examiner—Robert A. Dawson
Assistant Examiner—Ana M. Fortuna
Attorney, Agent, or Firm—Douglas L. Tschida

[57] ABSTRACT

A manifold mounted liquid filtration system including a disposable filter cartridge having first and second radial flow filtration stages containing filtration media of uniform porosity. A first stage includes a pair of annular, concentrically mounted, fibrous sediment and cast carbonaceous filter media. A second stage includes an annular cast carbonaceous filter media. Porous stage separators sequentially direct liquid flow into cavity spaces between the sidewalls of each stage and a liquid impermeable housing where the flow is radially redirected inward to a center outlet bore. The first stage filters suspended sediments, lead and other heavy metals. The second stage removes suspended bacteria, parasites volatile organic contaminants, herbicides, pesticides, industrial and agricultural contaminants, and the like. Various cartridge constructions having alternative O'ring sealed end caps and internal arrangements of stage separators are disclosed. Also disclosed is a disposable manifold cover/filter assembly.

21 Claims, 10 Drawing Sheets

MULTI-STAGE RADIAL FLOW FILTRATION SYSTEM

BACKGROUND OF THE INVENTION

The present invention relates to water treatment systems and, in particular, to a multi-stage, disposable cartridge filter including a housing having liquid impermeable sidewalls and usable with a manifold mounted residential water supply system.

Varieties of filtration systems have been developed for multi-user, residential water supplies serviced by a community water provider or personal on-sight well. Such systems typically include a manifold assembly that mounts to the supply conduits which supply the dwelling. The manifold assembly, in turn, typically includes a threaded headpiece that is secured to the supply conduits and a detachable cover that is secured to the headpiece to contain a filtration media. Some of these systems mount adjacent to a sink such as the kitchen sink in many homes.

Some systems provide a manifold cover which contains a renewable, loosely packed granulated filtration media. Other systems provide disposable cartridges having porous support assemblies such as pre-formed screens, which segregate the granular media and direct liquid flow through the media. Liquid flow is directed in most of such systems in a linear or end-to-end fashion through one or more sequentially arranged zones of media to remove predetermined contaminants. Some systems may provide linear serpentine flow paths within the cartridge. Examples of some of such systems can be found upon directing attention to U.S. Pat. Nos. 3,152,077; 3,342,340; 3,705,651; 4,626,350; 4,659,467; 4,731,183; 4,769,143; 4,913,808; and 4,948,505.

Difficulties can arise from such linear flow filters through an inefficient use of the media. That is, blockages or normal sediment collection at the upstream side of the filter increases system back pressure and can lead to premature disposal of the media before it is fully spent. Other difficulties arise from uneven packing of the granular media which leads to a non-uniform filtration porosity over the length of the media and which discourages a radial flow arrangement. Poured media beds also do not provide a sufficiently small porosity to filter many small particles or molecular contaminants, such as many heavy metals, agricultural chemicals and the like. Most typically, poured beds are capable of a filtration porosity of not less than 400 microns.

Some manifold systems exist which provide radial flow characteristics. Examples of two of such systems can be found at U.S. Pat. Nos. 3,262,570 and 3,289,847 and wherein unsealed, exposed filter media assemblies are provided. That is, the filter media cartridges do not provide surrounding liquid impermeable housings which contain and protect the media. In particular, the 3,262,570 cartridge provides an exposed, full length fiber media which concentrically surrounds an impermeable tube that contains a single bed of granular particulate. Radial flow occurs only between the fiber media and housing. The 3,289,847 cartridge, provides a cloth wrapped screen cartridge and two concentric cavities that contain granular media and provide radial flow to a center bore.

U.S. Pat. No. 5,024,764 discloses an exposed, cloth wrapped media which contains a single core of an annular cast block of powdered carbon material.

Although providing advantages of radial flow, difficulties can arise with the foregoing media through normal handling and shipping. That is, normal handling can damage or deform the media support structure, induce leakage of the media or cause a fracturing of the cast media.

Applicant is also familiar with a variety of sealed filtration assemblies, wherein the media is contained in a liquid impermeable housing, which directly attach to faucet-type water supplies. Liquid flow is directed in these assemblies along linear flow paths and sequentially arranged treatment stages. In some assemblies the flow paths may wind back and forth in a serpentine arrangement between inlet and outlet ports. Some of these assemblies are shown at U.S. Pat. Nos. 4,824,565; 4,711,723; 4,561,976; 3,529,726; 3,342,340; 1,774,004; 1,287,755; and 325,681.

In contrast to the known art, the present invention provides a novel radial flow filtration cartridge and disposable manifold assembly wherein a liquid impermeable housing contains several stages of filtration media. Each of the stages is arranged to obtain radial flow from an outer cavity space to a center outlet bore and preferably provides an annularly cast block of media of uniform porosity. Each stage also exhibits a preferred filtration characteristic that can be tailored to the application. In addition to removing sediment, odors and materials which affect taste, the filter media is selected and configured to advantageously filter suspended heavy metals, such as lead, and varieties of so-called "VOC" or volatile organic contaminants, herbicides, pesticides, bacteria, parasites, and industrial and agricultural chemicals.

SUMMARY OF THE INVENTION

It is accordingly a primary object of the present invention to provide a sealed multi-stage, radial flow filtration media having a liquid impermeable housing, except at inlet and outlet ports to an interior filter space.

It is a further object of the invention to provide a sealed replaceable cartridge for a manifold system or a disposable manifold housing, wherein flow is directed from a collection cavity at each of first and second filtration stages to surrounding cavities and then radially inward to a center bore.

It is a further object of the invention to provide radial flow via a cavity space formed between a liquid impermeable cartridge or manifold housing and each stage of filter media.

It is a further object of the invention to provide filtration stages including pre-formed, annular filter media, wherein portions of the media is cast as annular or tubular blocks, and wherein the media concentrically mounts within the cartridge or manifold housing and/or within adjacent media.

It is a further object of the invention to provide a cartridge having an outlet end cap which restrains and seals the filtration cartridge to a manifold headpiece to facilitate replacement.

It is a further object of the invention to provide flow directing stage separators at a cartridge inlet port, between successive intermediate flow stages and at a cartridge outlet port at an end cap which communicates with a central flow axis of the last stage.

It is a further object of the invention to mount the stage separators to prevent linear flow through the media and between the peripheral edges of the separators and the housing sidewalls.

It is a further object of the invention to provide stage separators which adhesively bond to the filter media and constrain the media relative to the housing to define a cavity at each stage from which the flow is radially redirected.

Various of the foregoing objects, advantages and distinctions of the invention are particularly obtained in a preferred construction which provides a cylindrical, liquid impermeable cartridge housing having a porous inlet end cap secured at one end and a porous outlet end cap secured at an opposite end.

The inlet end cap includes a plurality of radial flow directing apertures which in combination with an adjacent stage separator direct liquid flow to a first stage cavity space which concentrically surrounds a first stage filter media. An end separator seals the downstream end of the first stage filter media. The first stage media comprises a pair of concentrically arranged, preformed, annular filter media. A fibrous outer media is formed of spun fibers having a nominal porosity in the range of 1 to 25 microns and is selected to remove sediment. An inner cast carbonaceous media having a nominal porosity in the range of 1 to 25 microns is selected to reduce contaminants such as lead and other heavy metals.

An intermediate stage separator provides a plurality of concentric bands of annular through slots. Some of the slots facilitate adhesive bonding of the separator to the second stage filter media and others of the slots facilitate flow from intermediate and outer collection cavities to a central flow bore. Longitudinal projections positioned about the periphery and center of the separator define the outer flow cavity and constrain a cast, annular carbonaceous second stage filter media in centered relation to the housing. The second stage filter media is selected to have a nominal porosity in the range of 0.1 to 1.0 microns and to remove VOC's, herbicides, pesticides, and industrial and agricultural contaminants.

Alternative cartridge constructions containing alternative outlet end caps are contemplated. One end cap construction provides a compressible seal which mates to the manifold headpiece. Another provides an O'ring containing projection which surrounds a central flow bore and which projection mates with a recessed outlet port of the headpiece. Still another end cap includes multiple O'ring seals which are arranged along a recessed surface which mates with a projection that extends from the manifold headpiece.

Alternative configurations of cartridges including selected ones of the outlet end caps and differing arrangements of the stage separators or combinations thereof are also contemplated.

In an alternative manifold assembly and system, the cartridge housing is configured to mount directly to the manifold head piece without the necessity of a separate manifold cover piece.

Still other objects, advantages and distinctions of the invention will become more apparent upon reference to the following description with respect to the appended drawings. The description should not be literally construed in limitation of the invention. To the extent various modifications and improvements have been considered, they are described as appropriate. Otherwise, the invention should be interpreted within the broad scope of the following appended claims.

DESCRIPTION OF THE PREFERRED EMBODIMENT

Figure 1:
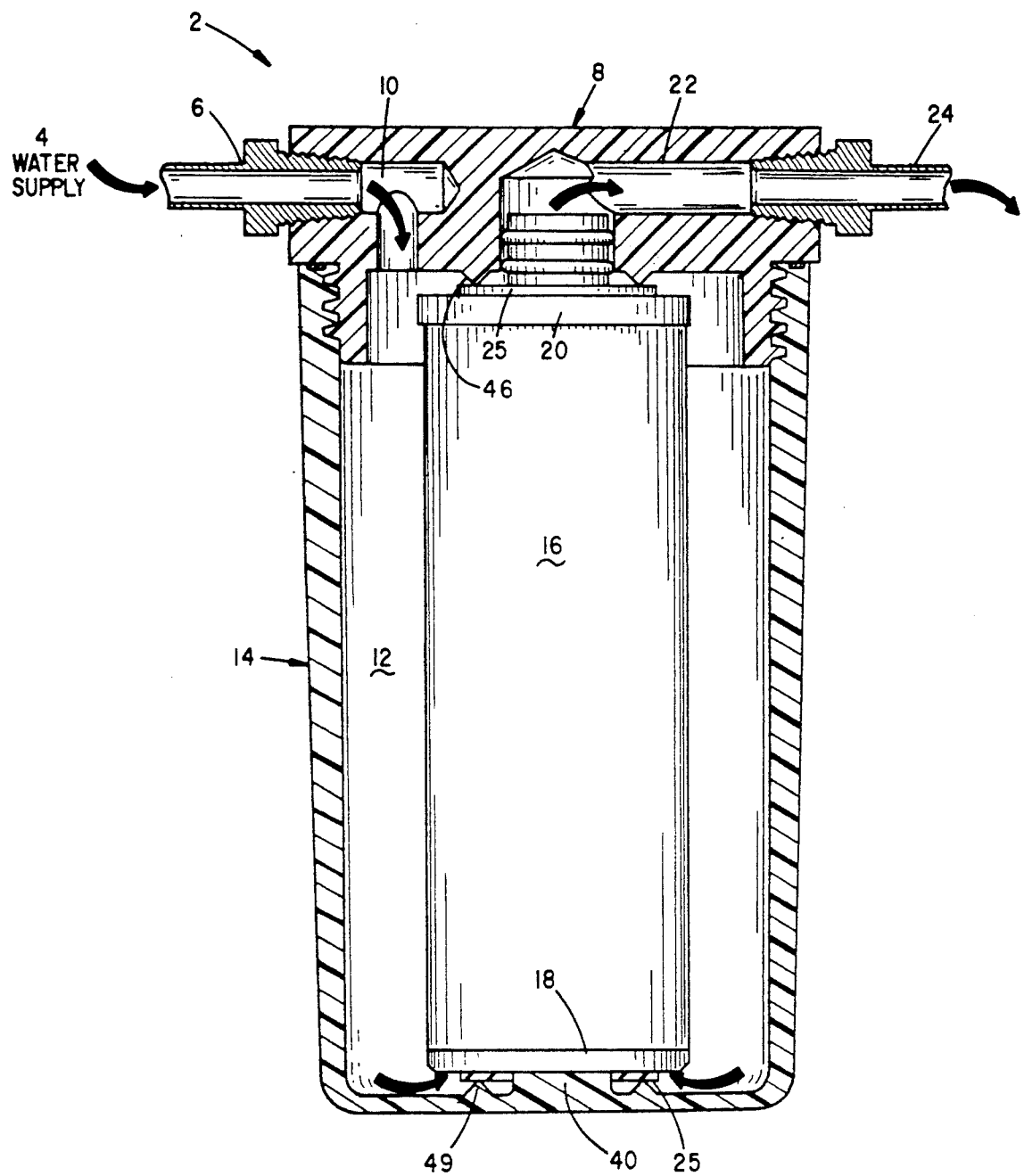
FIG. 1 is an elevation drawing of a manifold system including a head piece, removeable cover and a multi-stage radial flow cartridge filter of the present invention.

Referring to FIG. 1, a generalized cross section view is shown of a typical, manifold mounted water filtration system 2 used in a typical multi-user residential setting. Water is provided to the system from an available source such as an on-site well or a community operated water supply 4. The water is directed through an inlet conduit 6 to a manifold headpiece 8. An inlet channel 10 formed in the headpiece 8 directs the flow to a cavity 12 formed by a cover 14 that is secured to the headpiece 8. Typically, the cover 14 is threaded to the headpiece 8, although a variety of other detachment mechanisms for securing the cover to the headpiece 8 can be substituted to equal advantage.

Centered within the cavity 12 is a replaceable cartridge filter 16. The filter 16 provides liquid impermeable sidewalls and is supported within the cover 14 such that liquid flow is directed to a circular band of inlet ports in an inlet end cap 18, through an internal cavity space of the filter 16 and to a central outlet port at an outlet end cap 20. Aligned with the outlet port is an outlet flow channel 22 in the headpiece 8 and an outlet conduit 24 which supplies the dwelling or selected plumbing appliances within the dwelling. Rubber washers 25 seal the cartridge to the cover 14 and headpiece 8. O'ring seals are also depicted for illustration purposes and may be used in the fashion described at FIG. 5 below. Typically the washers 25 are not used in combination with O'ring seals.

Commercially available cartridge filters 16 used with most existing systems 2, typically provide a linear flow characteristic. That is, the liquid is directed through one or a number of sequentially arranged filtration stages provided within the cartridge 16. Although unsealed cartridge filters are available which permit radial flow through the sidewalls of the cartridge, such cartridges provide non-uniform porosity characteristics at relatively large pore sizes of not less than 400 microns. Such cartridges are also susceptible to damage during normal handling and storage of the cartridge, which can effect the life of the cartridge. The present invention overcomes these difficulties in the improved sealed cartridge constructions depicted in FIGS. 2 through 8 and disposable manifold housing of FIG. 9.

Figure 2:
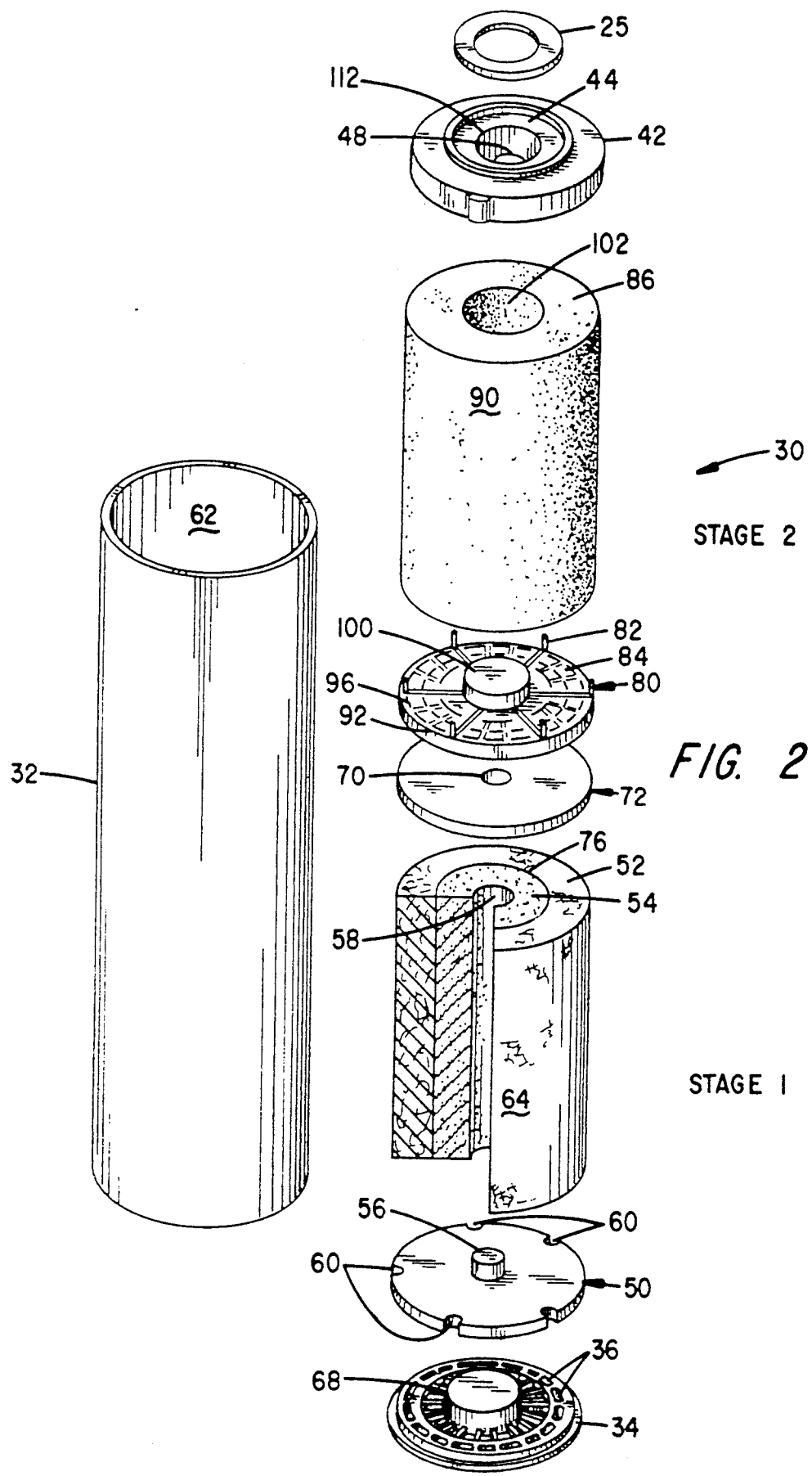
FIG. 2 is an isometric drawing shown in exploded assembly of one construction of a presently contemplated cartridge filter.
Figure 4:
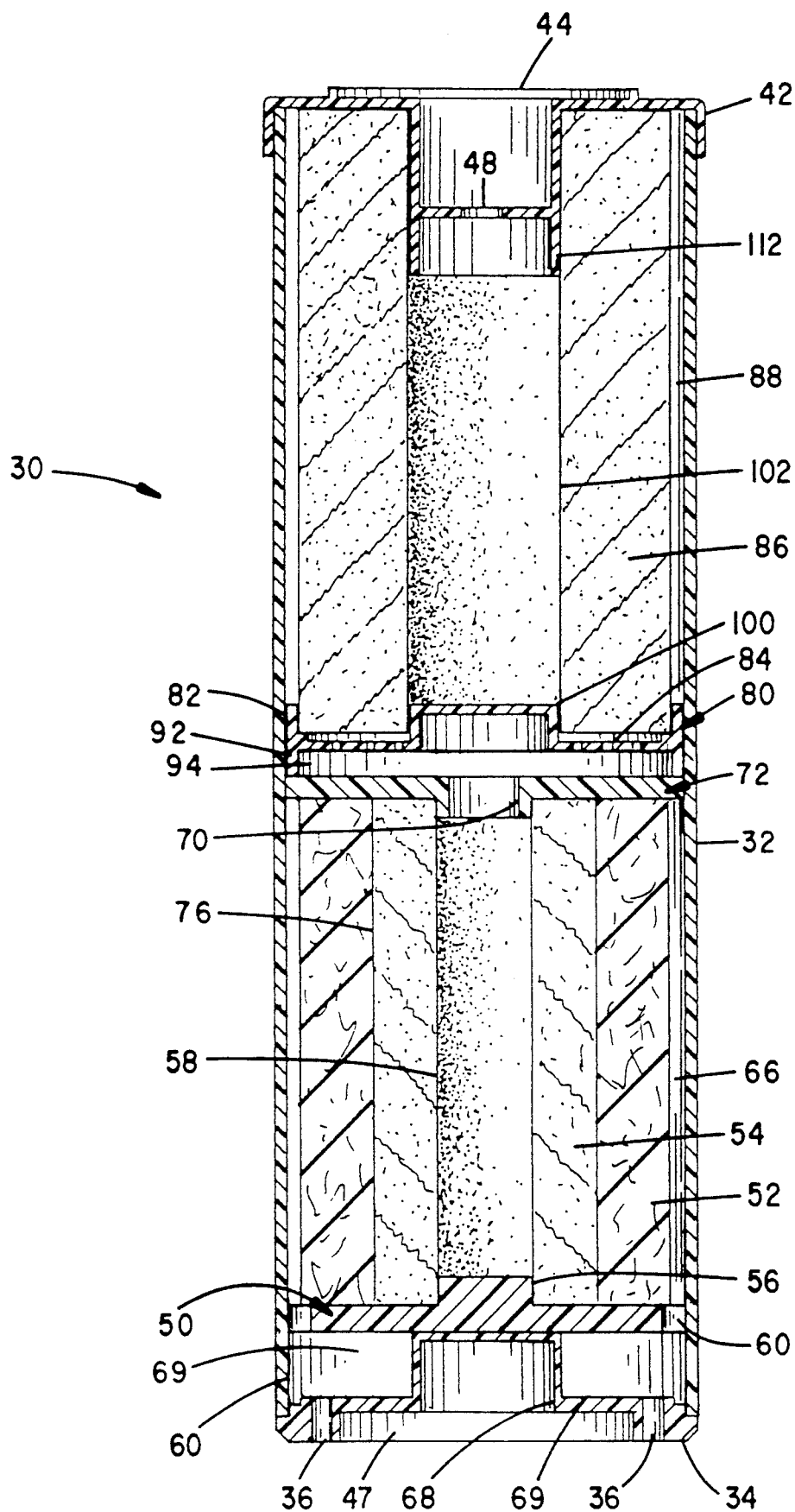
FIG. 4 is a cross sectioned elevation drawing of the cartridge filter assembly of FIG. 2.

With continuing attention to FIG. 1 and further attention to FIGS. 2 and 4, FIG. 2 depicts an isometric drawing shown in exploded assembly of a cartridge filter construction 30 which can be used with the manifold system 2. FIG. 4, in turn, depicts a cross sectioned elevation view of the cartridge filter 30. The filter 30 provides a liquid impermeable cylindrical housing 32 which extends the length of the cartridge 30. A porous inlet end cap 34 is bonded, such as by sonic welding or adhesives, to a lower end of the housing 32. A number of annularly arranged through apertures 36 are disposed about the periphery of the end cap 34 and through which liquid is admitted to the interior space of the cartridge 30. An annular washer 25 mounts in a recess 47 and about a projection 40 provided at the bottom of the cover 14. The washer 25 mates with an annular V-shaped ridge 49 that extends from the cover 14 to retain the lower end of the cartridge 30 in centered relation to the cover 14.

Secured to the upper end of the housing 32 is an outlet end cap 42. An annular recess 44 is provided in the upper most surface of the end cap 42 and receives an upper resilient washer or seal 25. The seals 25 are typically formed from an elastomer or rubber. The upper seal 25 mates with a V-shaped annular projection 46 that extends in concentric alignment with the outlet channel 22 of the head piece 8. Liquid flow is thus constrained between the inlet flow apertures 36 of the inlet end cap 34 and an outlet bore 48 of the outlet end cap 42. Intermediate flow within the cartridge 30 is radially directed at multiple stages which communicate with each other and filter selected contaminants. The details of such intermediate flow and flow defining structure are described below.

Supported within the housing 32 are first and second filtration stages. Stage 1 is principally comprised of a solid spacer or stage separator 50 and overlying concentrically mounted filter media elements 52 and 54. The separator 50 is adhesively bonded to the media 52 and 54. The diameter of the separator 50 is sized to permit a press fit into the housing 32.

A projection 56 extends from the separator 50 and mounts within a bore 58 of the filter element 54. The diameter of the outer most filter element 52 is selected to be less than the diameter of the separator 50 such that a plurality of notches 60 provided in the periphery of the spacer 50 align with a cavity space 66 created between an inner surface 62 of the housing 32 and an outer surface 64 of the filter element 52. The cavity space 66 is particularly apparent at FIG. 4.

A raised cap 68 extends from the end cap 34 and may support the separator 50 depending upon the length of the stage 1 filter media to create a liquid collection cavity 69. Liquid collects at the cavity 69 before passing through the notches 60 to the cavity space 66. Once admitted to the space 66, the system water pressure induces a radial flow through the filter media 52 and 54 to the central bore 58. From there, the liquid is admitted to the second stage via a bore 70 of an intervening spacer or stage separator 72. The separator 72 is adhesively bonded to the upper ends of the media 52, 54 and housing walls 62 and isolates stage 1 from stage 2, except via the bore 58.

The separators 50 and 72 are generally constructed of a liquid impermeable plastic, such as a polyvinyl plastic. Each separator exhibits a nominal diameter in the range of 1.5 to 5.5 inches, which diameter closely approximates that of the interior of the housing 32. Upon adhesively bonding the separators 50 and 72, to the filter media 52, 54 and the separator 72 to the housing surface 62 with a suitable adhesive, the first stage is isolated from the second stage and linear flow is prevented through the media and cartridge. Liquid flow is, in turn, constrained by the apertures 36 to the collection cavity 69, through the notches 60 to the outer cavity 66 and then to the bore 58 and stage 2.

The filter media 52 is selected to exhibit a capacity for filtering selected suspended sediments and large particulates, such as dirt particles, sand, scale etc., from the admitted water. A spun fibrous material is presently preferred, which is molded to a tubular or annular form and which provides a nominal porosity sufficient to filter sediment in the range of 1 to 25 microns. It is to be appreciated that the nominal porosity of the media can be selected as necessary for a specific application and to provide a desired liquid condition.

The filter media 54 is formed of a carbonaceous material which is cast from powdered carbon to the depicted annular or cylindrical shape. The media 54 is sized to mount within a bore 76 of the media 52. Presently the media 54 is constructed to provide a nominal porosity from 1 to 25 microns. This porosity is uniformly maintained per industry practices, within nominal tolerances, over the entire length and radial cross section of the media versus poured beds of particulate media which typically provide a non-uniform porosity at not less than 400 microns. Again, however, the nominal porosity can be varied as necessary.

The media 54 is particularly selected and constructed to reduce metallic contaminants such as lead particulates and other heavy metals that may be contained within the water. The media may also reduce other undesired contaminants such as chlorine, which can affect taste or odor. With the growing appreciation of lead contamination within many older dwellings having lead piping or lead soldered joints, it has become very desirable to reduce heavy metal contaminants and prevent potential lead poisoning of infants and children who drink the system water.

Figure 3:
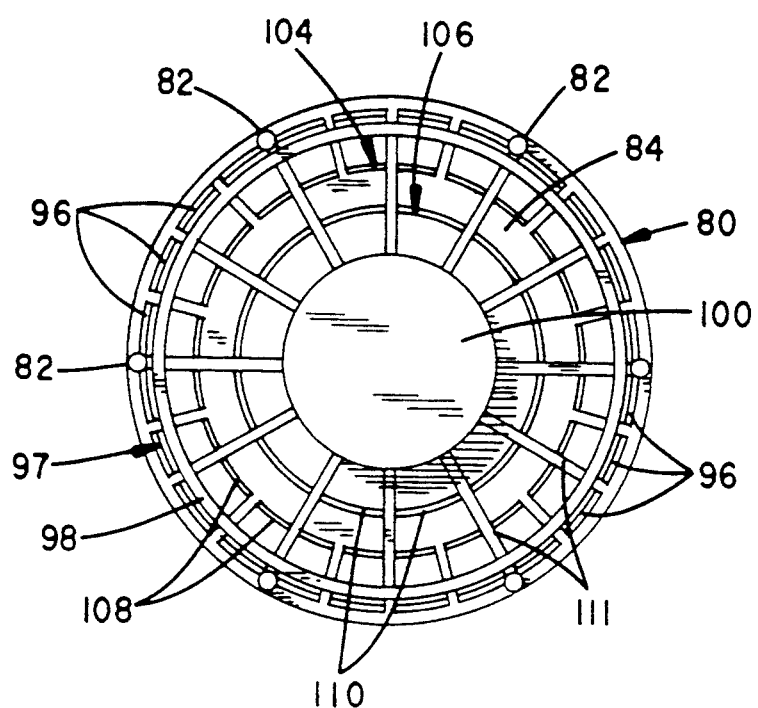
FIG. 3 is a top plan view of an adhesively bonded, flow directing stage separator included within the present cartridge filters.

With attention next to the second stage of the assembly 30 and further attention to FIG. 3, a porous spacer 80 is adhesively bonded above the separator 72 to the lower most end of the second stage media 86. The separator 80 exhibits a diameter essentially the same as the separators 50 and 72 and is press fit into the housing 32. A number of vertical or longitudinal projections 82 extend from an upper surface 84 of the separator 80 about an outer peripheral edge. The projections 82 center and restrain an overlying, pre-formed or cast carbon filter media 86 to the separator 80. The projections 82 also define a cavity space 88 between the interior surface 62 of the housing 32 and the outer surface 90 of the media 86. The cavity space 88 is more apparent at FIG. 4.

A vertical or longitudinal flange 92 also projects downward from the peripheral edge of the separator 80 to define a collection cavity 94 between the stage separators 72 and 80. The cavity 94 receives liquid admitted from the first stage through the bore 70 and is shown at FIG. 4.

A plurality of slits or liquid flow apertures 96 extend in a circular band 97 about the periphery of the separator 80 in alignment with the cavity space 88 partially defined by the projections 82. An annular ridge 98 isolates the adhesive used to secure the separator 80 to the media 86 from the flow apertures 96. A projecting center hub 100 is sized to mount within a bore 102 of the filter media 86. Two additional bands of slits 104 and 106 between the hub 100 and ridge 98 provide a plurality of through apertures 108 and 110 through which the adhesive is relieved as the filter media 86 is pressed into contact with the separator 80. Thus, the filter media 86 is secured to the separator 80 via the combination of the projections 82, hub 100 and a compatible adhesive. The media 86 is thereby firmly restrained within the housing to prevent damage or breakage.

Although one preferred form of the separator 80 is shown, it is to be appreciated other constructions can provide comparable functionality. For example, the plastic material between the projections 82 at the peripheral edge can be removed to increase the size of the flow apertures 96. Similarly, the plastic material containing the slits 108 and 110 in the region between the hub 100 and ridge 98, and except for the connecting spokes 111, can be removed to facilitate the spreading of the adhesive and to use the adhesive to seal the lower end of the filter media 86 in lieu of the removed material of the separator 82.

The upper end of the filter media 86 is restrained in alignment to the end cap 42 via a depending cylindrical projection 112 which includes the flow bore 48 and which projection mounts in the bore 102 of the media 86. The media 86 is also secured to the end cap 42 with an adhesive. Presently, a hot melt adhesive is used to appropriately seal the separators 50, 72 and 80, to the media 52, 54 and 86. The separator 72 is also adhesively bonded to the housing 32. Other adhesives which are compatible with the environment and mating materials may also be used. The separator 72 is also adhesively bonded to the housing 32. The end caps 34 and 42 are sonically bonded to the housing 32, although may be secured with an adhesive.

The filter media 86 comprises a carbonaceous material which is pre-formed or cast to the depicted annular configuration. The media exhibits a uniform nominal porosity over the length and radial cross section of the media. The porosity is established in a range from 0.1 to 1.0 microns, and which porosities are established depending upon the cartridge application to remove VOC contaminants, as well as herbicides, pesticides and varieties of bacteria, parasites and other industrial and agricultural chemicals which may be contained within the water.

In addition to the described types of media and ranges of media porosity, it is to be recognized that the relative porosity of the media 52, 54 and 86 to one another can be adjusted as necessary to filter other undesired materials. In combination, however, the described filter cartridge 30 and selected media 52, 54 and 86 have demonstrated desirable radial flow characteristics and improved filtration capabilities that substantially reduce or remove contaminants found in most residential water supply systems.

Figure 5:
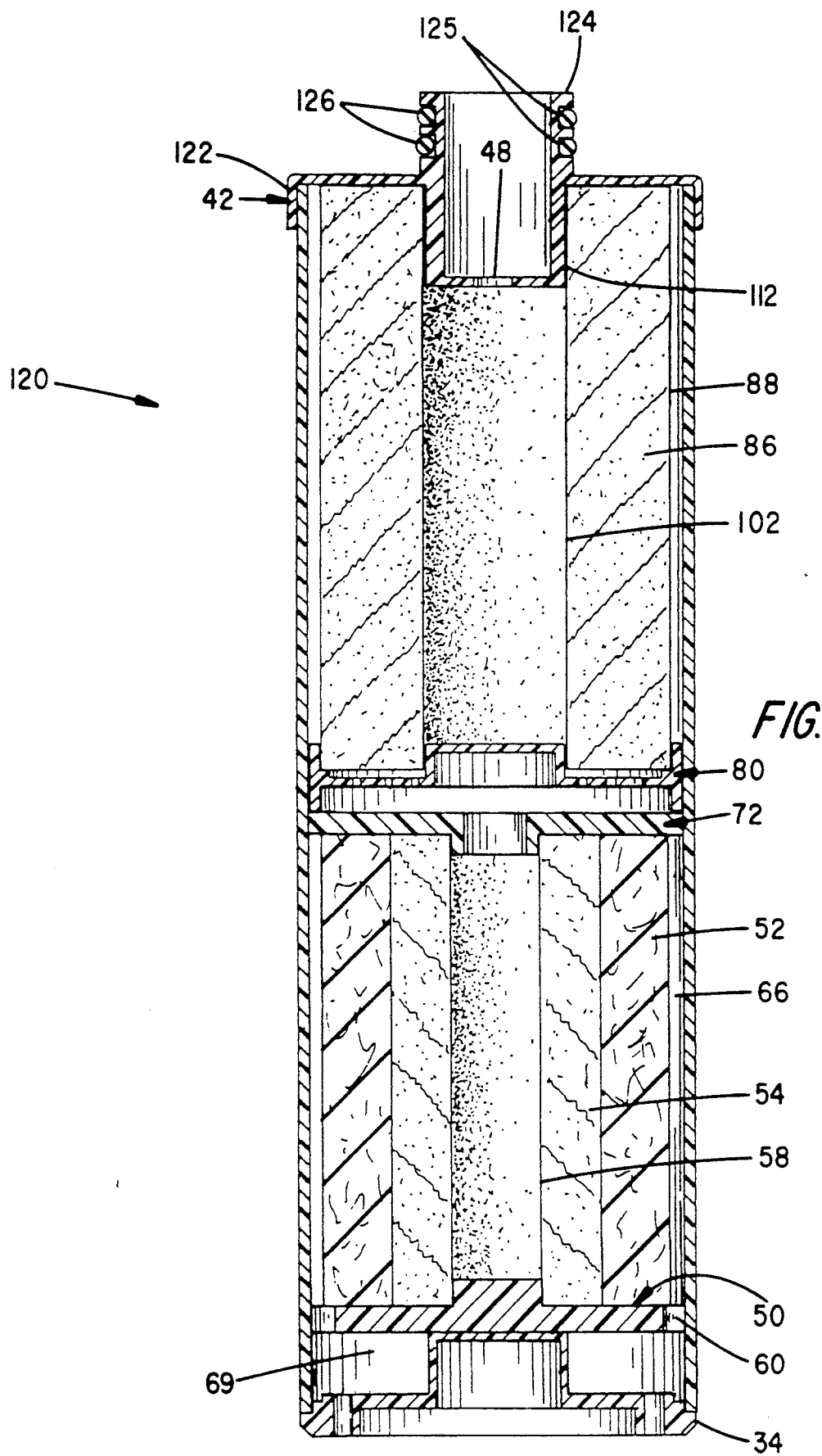
FIG. 5 is a cross sectioned elevation drawing of a cartridge filter assembly similar to FIG. 2 but including an outlet end cap containing multiple O'ring seals mounted to a projection piece.
Figure 6:
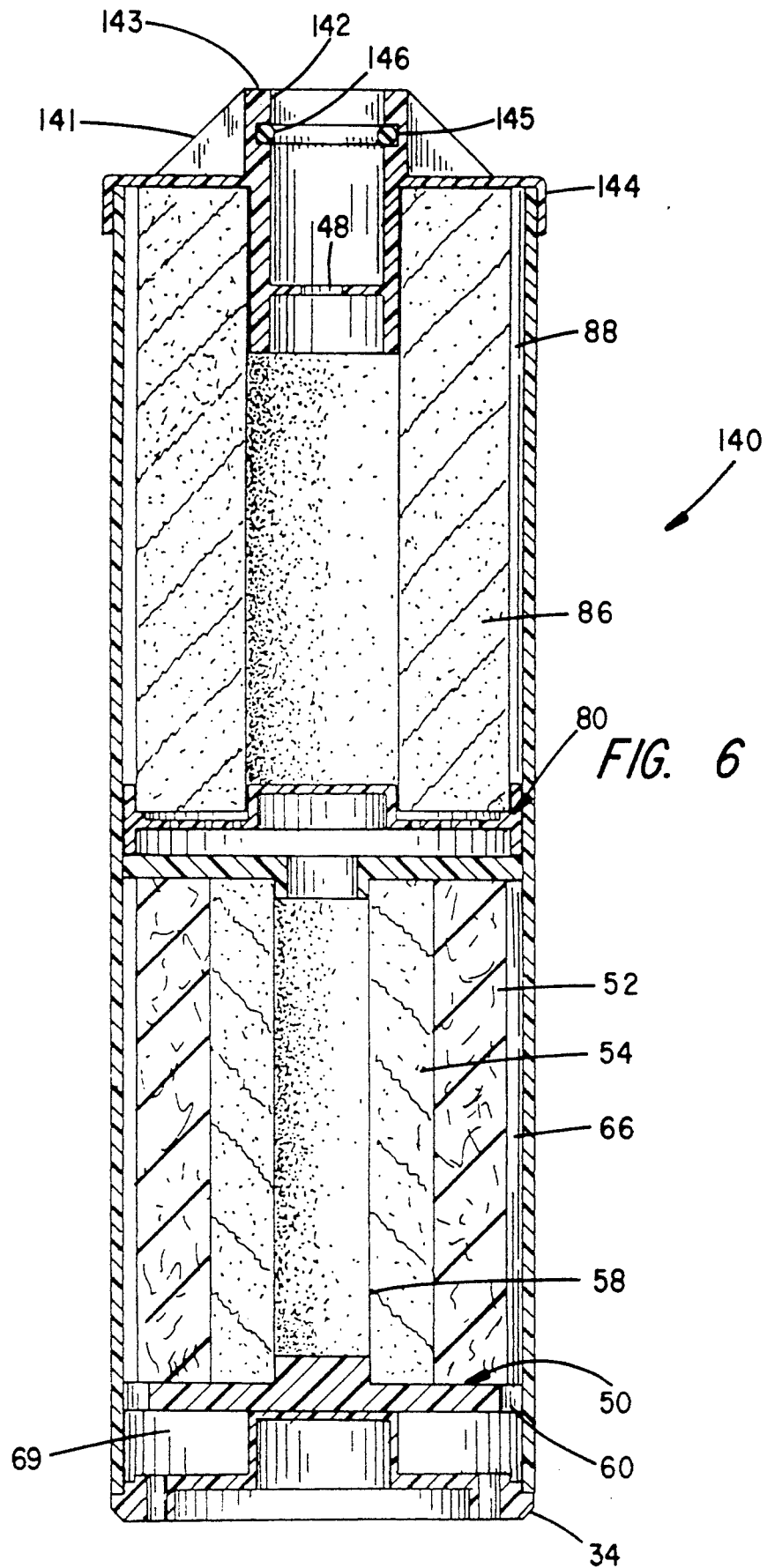
FIG. 6 is a cross sectioned elevation drawing of a cartridge filter assembly similar to FIG. 2 but including an outlet end cap having an O'ring sealed recess.
Figure 7:
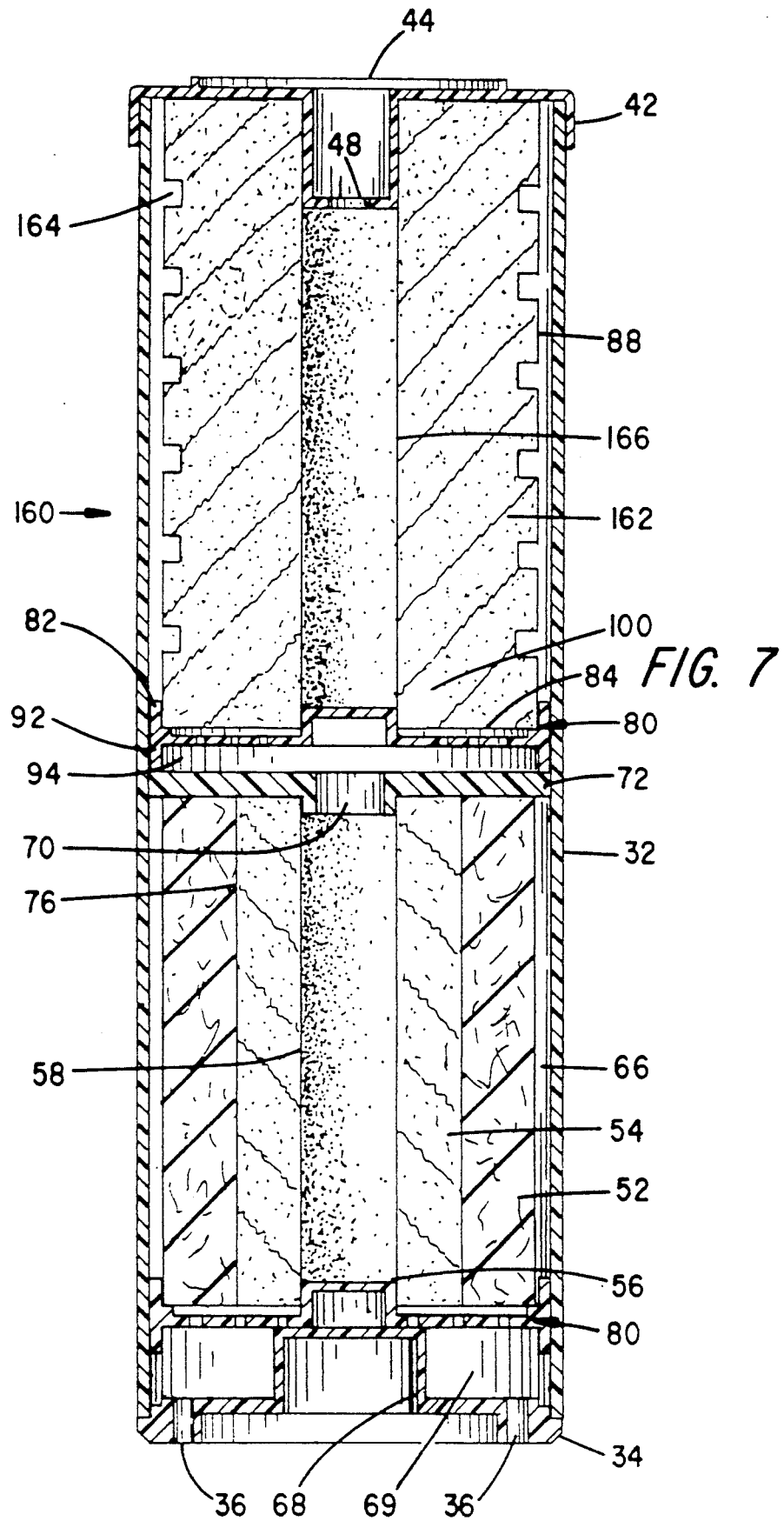
FIG. 7 is a cross sectioned elevation drawing of a cartridge filter similar to that of FIG. 2 but including multiple stage separators as shown in FIG. 3 and a second stage filter media of increased surface area.

Attention is next directed to FIGS. 5, 6 and 7 and wherein alternatively configured cartridge filter assemblies 120, 140 and 160 are depicted. Each of the cartridges 120, 140 and 160 are constructed in a comparable fashion to the cartridge 30 and contain comparable first and second filtration stages and annularly arranged filter media. The principle distinctions between the alternative cartridge constructions relates to the arrangement of separators provided between the stages and the configurations of the outlet end caps. FIG. 7 also depicts an arrangement wherein the surface shape of the second stage filter media provides increased surface area.

With particular attention to FIG. 5, an alternative filtration cartridge 120 is depicted and wherein separators 50, 72 and 80, such as depicted in FIGS. 2 and 3, are respectively and adhesively bonded to the mating surfaces of the media 52, 54 and 86 of the first and second stages. The separator 72 is also bonded to the housing surface 62. As before, radially directed flow is obtained.

Extending, however, from the end cap 122 is a projection 124 which contains a pair of annular recesses 125 and O'ring seals 126. The seals 126, upon mounting the projection 124 into a recess aligned with the outlet channel 22 of the headpiece 8, seal and restrain the cartridge 120 to the cover 14 and headpiece 8. That is, the seals 126 retain the cartridge 120 to the headpiece 8 in proper alignment with the outlet channel 22 during cartridge replacement, until the cover is re-attached. More of the details of the mounting of such a cartridge are described with respect to FIG. 8. See also FIG. 1.

FIG. 6 depicts a comparable arrangement to the cartridge 120 of FIG. 5, except wherein a bore 142 of the end cap 144 contains an annular recess 145. Trusses 141 support a projection 143 which contains the bore 142. Mounted within the recess 145 is a single O'ring seal 146. Such a filter 140 is typically mounted to a headpiece 8 having a projection that communicates with the outlet channel 22 and which mounts within the bore 142.

The cartridge 160 of FIG. 7 depicts a cartridge construction similar to that of FIGS. 2 and 4 but wherein the separator 50 is replaced with a second separator 80. The flow apertures 96 of the lower separator 80 communicate with the sidewall and collection cavities 66 and 69. The filter media 162 of the second stage, otherwise, includes a number of longitudinally spaced apart annular notches 164 which are cut into the outer surface 90 of the media 86. The notches 164 increase the filtration surface area of the filter media 162. The center bore 166 of the media 162 also exhibits a reduced diameter from the cartridges 30, 120 and 140 to prevent breakage of the media 162.

Figure 8:
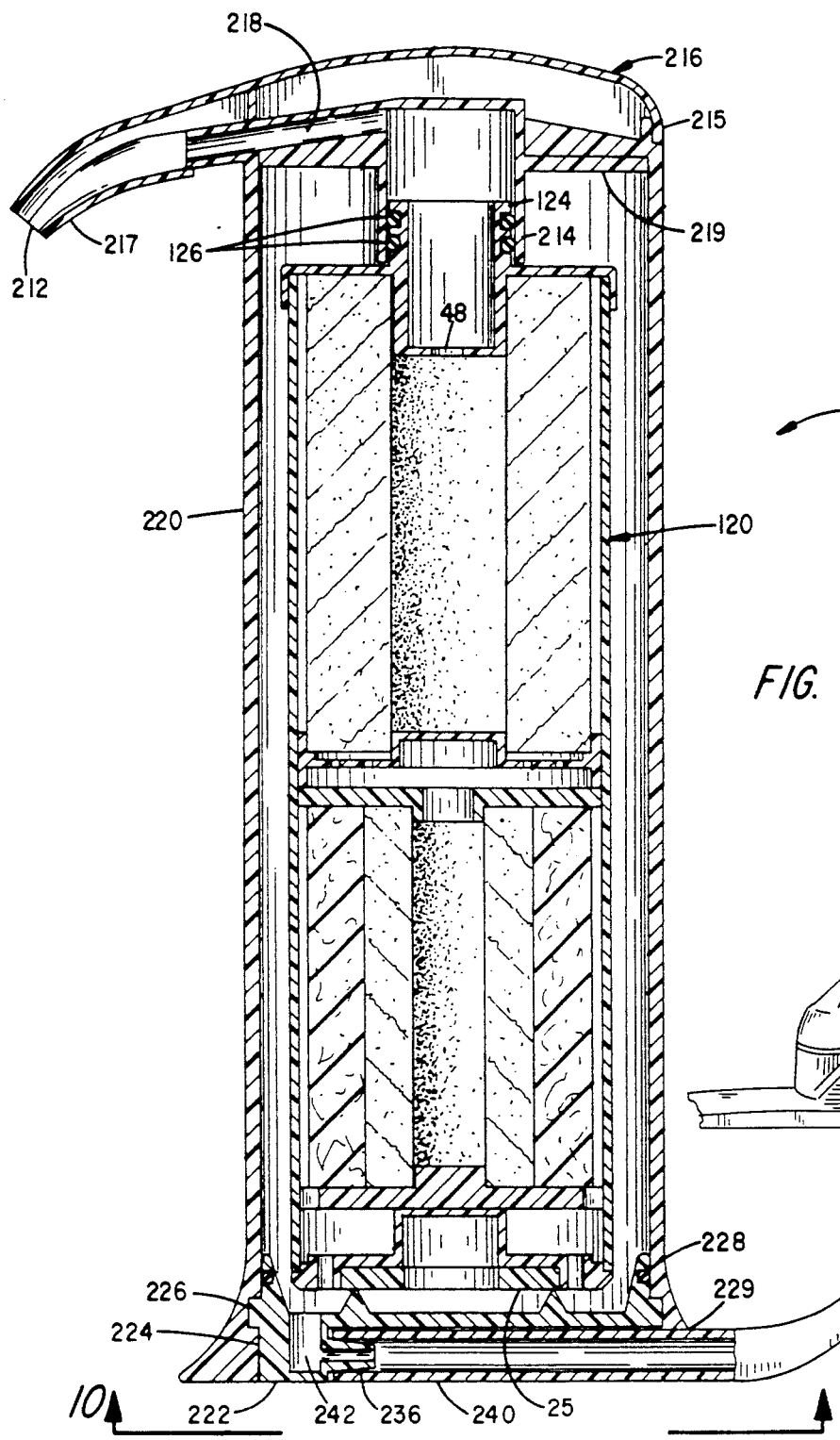
FIG. 8 is a cross sectioned elevation drawing of a radial flow filter cartridge similar to FIG. 5 mounted within twist locked, counter-top manifold system.
Figure 9:
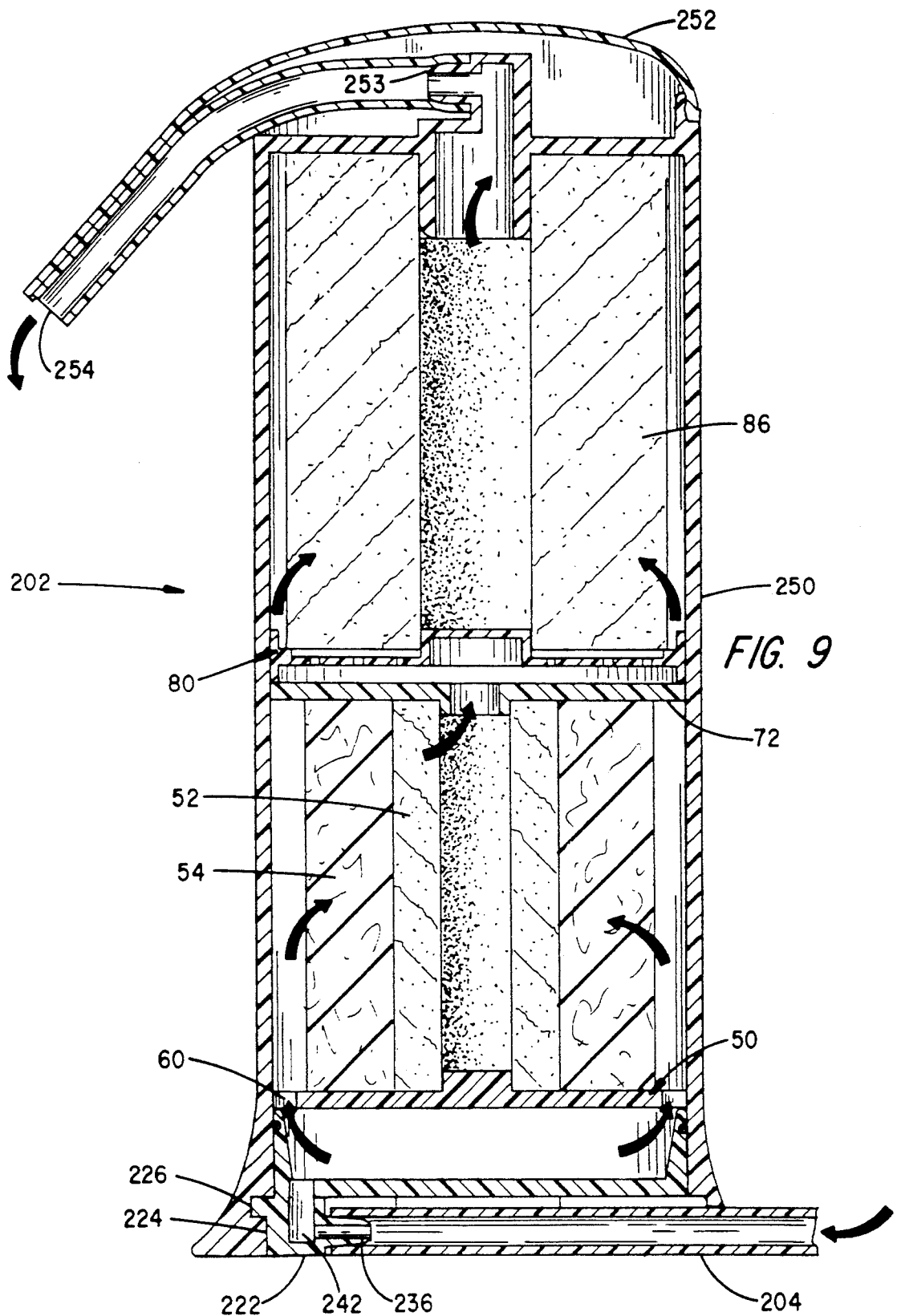
FIG. 9 is a cross sectioned elevation drawing of a disposable counter-top manifold assembly wherein the manifold cover piece replaces the housing and includes integral radial flow stages.

FIGS. 8 and 9 lastly disclose alternative manifold assemblies 200 and 202 which find application in conjunction with providing filtered tap water. As seen at FIG. 8, the manifold 200 is coupled via a flexible conduit 204 to a conventional diverter valve 206 which mounts to the end of a conventional spigot 208, such as found at a kitchen sink. The diverter 206 includes an internal valving mechanism (not shown) which cooperates with an actuator 210 to divert flow from the spigot 208 through the conduit 204 and to the manifold assembly 200. Upon passing through the manifold 200, the water exits at a nozzle 212. Such a manifold assembly is commonly mounted to a countertop adjacent control faucets to the spigot 208 and provides the homeowner with a readily accessible supply of filtered water.

As apparent from FIG. 8, the manifold assembly 200 is readily adaptable to use with the cartridge filters 30, 120 and 140 of the present invention. In particular, the cartridge 120 of FIG. 5 is mounted within the assembly 200. The projection piece 124 mounts within a mating bored projection 214 which extends from a headpiece 216 of the manifold assembly 200. An outlet flow channel 218 of the headpiece 216 receives the filtered water and conveys the water to the nozzle 212. The headpiece 216 is configured of two pieces 215 and 217 which are snap mounted to each other and bonded to the construction shown. An end piece 219 otherwise is formed as part of a primary column 220 and seals the outlet end of the assembly 200, except at the flow channel 218 which is partially defined upon attaching the pieces 215 and 217 to one another. The piece 215 provides an aesthetically pleasing cover and mates to the assembly to form the nozzle 212.

The vertical upright column portion 220 of the assembly 200 contains the cartridge 120 in liquid tight engagement to a base 222 which typically mounts to a counter top adjacent the spigot 208. Although not disclosed in detail, the column 220 is secured to the base piece 222 via a twist lock or threaded action. That is, channeled slots 224 are formed into the column 220 and receive prongs 226, which extend from the base 222. Upon aligning the prongs 226 with horizontal portions of the slots 224, the column 220 is rotated approximately a quarter turn to lock the column 220 to the base 222. One or more internal O'rings 228 mounted to the base 222 prevent leakage of liquid passing through the column 220.

A flexible conduit 204, usually a ¼ inch plastic hose, projects through a slot 229 cut through the sidewall of the column 220. The conduit 204 mounts in a cavity space beneath the base 222 to an inlet port to the interior space of the column 220. More of the details of the mounting of the conduit 204 to the base 222 are shown in FIG. 10.

Figure 10:
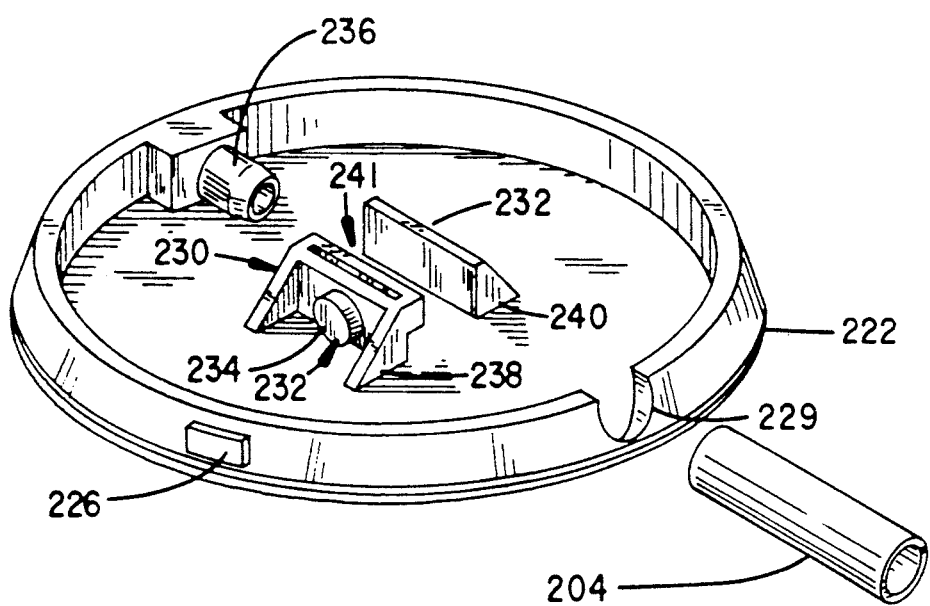
FIG. 10 is an isometric drawing of a flow restrictor usable with the assemblies of FIGS. 8 and 9.

With reference to FIG. 10, the conduit 204 is first passed through the slot 229. The conduit 204 next passes through a restrictor assembly 230 which is operable via a restrained pinch-type actuator assembly 232 to selectively pinch off or control flow through the flexible conduit 204. From the restrictor 230, the conduit 204 mounts to an offset, flared nipple 236 that projects from the base 222. A bored channel 242 of the nipple 236 communicates with the column interior. Once admitted, water flows through the cartridge 120 in the fashion previously described.

As presently constructed, the restrictor assembly 230 includes a pair of opposed vertical upright members 238, 240 which define a center channel 241 wherein the conduit 204 is mounted. A pinch actuator 234 mounts to the member 238 and projects into the channel 241. An actuator latch or retainer (not shown) contained within the member 238 cooperates with the actuator 234 to provide a controlled exposure of the actuator 234 into the channel 241. In one construction, the actuator 234 may include threaded surfaces which cooperate with the member 238. For such an actuator, the retainer prevents counter rotation of the actuator 234, once a desired liquid flow is obtained through the filter 120.

FIG. 9 lastly discloses a disposable manifold assembly 202 wherein a vertical column piece 250 and head piece 252 comprise a disposable cartridge. Adhesively bonded and/or press fit within the column piece 250 are multiple radial, flow filter stages including filter media 52, 54 and 86 and stage separators 50, 72 and 80, such as described in relation to FIGS. 2–7. The stage separators 50, 72 and 80 are bonded to the filter media 52, 54 and 86 in the fashion described above. The stage separator 72, otherwise, is directly bonded to the column 25 to isolate the first and second stages. The column 250 thus replaces the liquid impermeable housing 32 and inlet and outlet end caps 34 and 42.

Instead of coupling to an outlet conduit 24 such as in FIG. 1, the filtered water is ejected from a tube 254 that extends from beneath the head piece 252 and is secured to a flared nipple 253 formed as part of the outlet end of the column filter 250. A base or counter piece 222 is permanently bonded to the column 250. Alternatively and as described and depicted at FIG. 8, the base 222 can be assembled to permit detachment from the column 250.

While the invention has been described with respect to variously preferred constructions and considered modifications and improvements thereto, still other equivalent constructions may be suggested to those skilled in the art. Accordingly, the following claims should be interpreted to include all those equivalent embodiments within the spirit and scope thereof.

What is claimed is:

1. A filtration system comprising:
   (a) manifold means for distributing a liquid and including a headpiece coupled to pressurized inlet and outlet liquid conveying conduits, a cover, and means for detachably sealing said cover to said headpiece to form a cavity between said cover and said headpiece in communication with liquid flow through said conduits; and
   (b) filter means mounted within said cavity for removing contaminants from liquid passing through said cavity comprising;
      (1) a liquid impermeable housing including a tubular body secured between an inlet end cap and an outlet end cap, wherein the inlet end cap includes an inlet port in flow communication with the cavity, wherein said outlet end cap includes an outlet port and means for sealing said outlet port in flow communication to said outlet liquid conduit;
      (2) a cast carbonaceous first filter element having a longitudinal first bore, first means for longitudinally displacing said first filter element from said inlet end cap, for defining a first annular cavity between said tubular body and said first filter element, and for directing flow from said inlet port to said first cavity and such that flow radially passes from said first cavity to said first bore; and
      (3) a second filter element having a longitudinal second bore in flow communication with said outlet port, second means for longitudinally displacing said first filter element from said second filter element, for defining a second annular cavity between said tubular body and said second filter element, and for directing flow from said first bore to said second cavity and such that flow radially passes from said second cavity to said second bore and thereby to said outlet port.

2. Apparatus as set forth in claim 1 wherein said first means comprises:

(a) a liquid impermeable spacer having a plurality of apertures, wherein said first spacer is secured to said tubular body at a region longitudinally displaced from said inlet end cap, and wherein said apertures coaxially align with said first cavity; and
(b) a second liquid impermeable spacer secured downstream of said first filter element and having a bore mounted in flow communication with said first bore.

3. Apparatus as set forth in claim 1 including an annular spun fiber filter element concentrically mounted adjacent said first filter element and wherein said first filter element exhibits a porosity in the range of 1 to 25 microns.

4. Apparatus as set forth in claim 2 wherein said first spacer includes a projection which mounts in the bore of said first filter element, wherein said inlet end cap includes a plurality of apertures arranged about a peripheral edge in coaxial alignment tot he apertures of said first spacer and further includes means contacting said first spacer for defining a cavity between said inlet end cap and said first spacer.

5. Apparatus as set forth in claim 1 wherein said second means comprises:
(a) a liquid impermeable first spacer secured to said tubular body downstream of said first filter element and having a bore coaxially aligned with said first bore; and
(b) a liquid impermeable second spacer secured to said tubular body having a plurality of apertures in flow communication with said second cavity and further including means contacting said first spacer for defining a cavity between said first and second spacers; and
(c) a liquid impermeable third spacer secured to said tubular body downstream of said second filter element and having a bore mounted in flow communication with the second bore and the outlet port.

6. Apparatus as set forth in claim 5 wherein said second filter element comprises an annular cast carbonaceous filter element which exhibits a porosity in the range of 0.1 to 1.0 microns.

7. Apparatus as set forth in claim 5 wherein said second spacer includes a first projection which mounts in the second bore and a plurality of second projections which extend into said second cavity between the tubular body and the second filter element.

8. Apparatus as set forth in claim 7 wherein said second spacer is adhesively bonded to said second filter element and wherein said second spacer includes means for preventing adhesive from obstructing the plurality of apertures communicating with said second cavity.

9. Apparatus as set forth in claim 8 wherein a cylindrical flange longitudinally projects from said second spacer and contacts said first spacer.

10. Apparatus as set forth in claim 1 wherein said outlet end cap includes a projection having at least one annular recess let into an outer peripheral surface and an O'ring seal mounted within said recess.

11. Apparatus as set forth in claim 1 wherein said outlet end cap includes a projection which mates with said headpiece, which projection includes a bore in flow communication with said second bore, and further including means for sealing a juncture between said projection and said headpiece.

12. Apparatus as set forth in claim 1 wherein at least one of said first and second filter elements includes a plurality of displaced annular notches.

13. Liquid filtration apparatus comprising:
(a) a liquid impermeable housing including a tubular body secured between an inlet end cap and an outlet end cap, wherein the inlet end cap includes an inlet port and said outlet end cap includes an outlet port;
(b) a first annular, cast carbonaceous filter element having a porosity in the range of 1 to 25 microns and a longitudinal first bore and including a fiber filter element concentrically mounted adjacent said carbonaceous filter element;
(c) first means in flow communication with said inlet port for defining a first annular cavity between said tubular body and said first filter element, and for directing flow from said inlet port to said first cavity and such that flow radially passes from said first cavity to said first bore; and;
(d) a second annular, cast carbonaceous filter element having a porosity in the range of 0.1 to 1.0 microns and a longitudinal second bore in flow communication with the outlet port; and
(e) second means for longitudinally displacing said first filter element from said second filter element, for defining a second annular cavity between said tubular body and said second filter element, and for directing flow from said first bore to said second cavity and such that flow radially passes from said second cavity to said second bore and thereby to said outlet port.

14. Apparatus as set forth in claim 13 wherein said inlet end cap includes means for coupling to a flexible liquid conduit and restriction means for selectively restricting flow through said conduit.

15. Apparatus as set forth in claim 14 wherein said restriction means defines a channel which receives said conduit and includes an actuator means which projects into said channel for selectively compressing walls of said conduit.

16. Apparatus as set forth in claim 14 wherein said outlet end cap comprises a plurality of portions which mount to one another in alignment with the outlet port and define an outlet nozzle.

17. Apparatus as set forth in claim 13 wherein said inlet end cap includes a plurality of projections and said body includes a plurality of channels wherein each channel has vertical and horizontal portions which channel portions rotationally interlock with said projections.

18. Liquid filtration apparatus comprising:
(a) a liquid impermeable tubular column having a headpiece including a liquid outlet port;
(b) a base including an inlet port;
(c) means for coupling said base to said column to form a flow cavity; and
(d) filter means mounting within said flow cavity for removing contaminants from liquid passing through said column comprising;
(1) a liquid impermeable housing including a first annularly cast carbonaceous filter element having a longitudinal first bore;
(2) first flow directing means for concentrically containing said first filter element within said column and defining a first annular cavity between said column and said first filter element in flow communication with said inlet port and such that flow radially passes from said first cavity to the first bore;

(3) a second cast carbonaceous filter element having a longitudinal second bore in flow communication with the outlet port; and (4) second flow directing means for concentrically retaining said second filter element within said column and defining a second cavity isolated from said first cavity between said second filter element and said column and means communicating with said first bore for directing flow to said second cavity and such that flow passes radially from said second cavity to said second bore.

19. Apparatus as set forth in claim 18 wherein said base includes means for coupling a flexible liquid conduit to said inlet port and means for selectively compressing said conduit to restrict flow therethrough.

20. Liquid filtration apparatus comprising:
(a) a liquid impermeable housing having an inlet and an outlet port;
(b) a first cast carbonaceous filter element having a longitudinal first bore;
(c) first spacer means for longitudinally displacing said first filter element from said inlet port and defining a first annular cavity between said housing and said first filter element and for coaxially directing flow from said inlet port to said first cavity and such that flow radially passes from said first cavity to said first bore; and;
(d) a second cast carbonaceous filter element having a longitudinal second bore in flow communication with the outlet port; and
(e) second spacer means for longitudinally displacing said first filter element from said second filter element and defining a second annular cavity between said housing and said second filter element and for directing flow from said first bore to said second cavity and such that flow radially passes from said second cavity to said second bore and thereby to said outlet port.

21. Apparatus as set forth in claim 20 wherein said housing includes a base containing said inlet port and means for coupling a liquid conduit having flexible walls to said inlet port and means for selectively compressing the walls of said conduit to restrict flow therethrough.

* * * * *